United States Patent [19]

Turner et al.

[11] Patent Number: 5,342,514
[45] Date of Patent: Aug. 30, 1994

[54] ELECTRICAL FILTER

[75] Inventors: Andrew D. Turner, Abingdon; Stanley D. Derham, Swindon; Peter C. Lovegrove, Didcot, all of Great Britain

[73] Assignee: United Kingdom Atomic Energy Authority, Didcot, Great Britain

[21] Appl. No.: 72,846

[22] Filed: Jun. 7, 1993

[30] Foreign Application Priority Data

Jun. 20, 1992 [GB] United Kingdom ............ 9213135.8

[51] Int. Cl.$^5$ .................. B01D 29/62; B01D 35/06
[52] U.S. Cl. .................... 210/193; 210/243; 210/407; 204/302
[58] Field of Search ............ 210/777, 778, 785, 791, 210/193, 243, 407, 409, 410, 498, 499; 55/108; 204/302, 305

[56] References Cited

U.S. PATENT DOCUMENTS

| | | | |
|---|---|---|---|
| 3,252,885 | 5/1966 | Griswold | 210/243 |
| 3,935,107 | 1/1976 | Yagishita | 210/243 |
| 3,957,636 | 5/1976 | Arvanitakis | 210/193 |
| 4,238,326 | 12/1980 | Wolf | 210/243 |
| 4,986,906 | 1/1991 | Dadisman | 210/243 |

FOREIGN PATENT DOCUMENTS

| | | |
|---|---|---|
| 0165744 | 12/1985 | European Pat. Off. . |
| 0380266 | 8/1990 | European Pat. Off. . |
| 0474365 | 3/1992 | European Pat. Off. . |
| 1044963 | 10/1966 | United Kingdom . |
| 2160544 | 12/1985 | United Kingdom . |
| 2201967 | 9/1988 | United Kingdom . |

*Primary Examiner*—Thomas Wyse
*Attorney, Agent, or Firm*—William R. Hinds

[57] ABSTRACT

A filter (10) comprises a stack of flat rectangular filtrate-collecting chambers (12) defined by sheets (26) of stainless steel filter medium, and connected via respective thyristors (54, 58) to a power supply (50). Anode plates (14) are arranged between adjacent chambers (12). At intervals a current (of for example 1000A) is supplied to each chamber (12) in turn such that it is a cathode, for a short time sufficient to remove any fouling.

9 Claims, 3 Drawing Sheets

ELECTRICAL FILTER

This invention relates to a filter, and in particular to a filter incorporating means by which it can be cleaned in situ.

A method for cleaning an electrically conducting filter is described in GB 2 160 545 B, the method enabling fouling to be removed from the filter in situ. In this method an electrochemical cell is established comprising the filter as a first electrode, a counter electrode, and with the process liquid as the electrolyte. At intervals during the filtration process a potential difference is applied between the first electrode and the counter electrode so as to generate at the filter a gaseous product, which may be in the form of microbubbles, and which cleans the filter. For example, a current of 500–3000 A/m$^2$ of membrane might be applied for 1–5 seconds periodically between 4–15 times/hour. This method is applicable for example where the filters are metallic microporous membranes such as those of stainless steel mesh or sintered stainless steel, microporous graphite membranes, or microfiltration and ultrafiltration membranes of conducting ceramics such as doped titania or zirconia. However where a large filtration area is required, for example several square meters, there are considerable difficulties in supplying a sufficiently large current, in ensuring the current density is substantially uniform over the whole filter, and in ensuring the consequent dissipation of electrical energy does not lead to excessive temperature rise in the liquid undergoing treatment.

According to the present invention there is provided a filter comprising a plurality of cathode modules, each cathode module comprising two electrically conducting flat sheets of filter medium spaced apart to define between them a filtrate chamber, electrically conductive mesh components within the filtrate chamber to support the filter medium, and a frame around the periphery of the cathode medium; each cathode module being located between two flat anode sheets of electrically conducting material so as to define, between the cathode module and the adjacent anode sheets, flow channels for a liquid to be treated; electrically insulating means to support the cathode modules relative to the anode sheets; inlet and outlet means for the liquid to be treated, communicating with the said flow channels, and an outlet duct for filtrate from each filtrate chamber; and electrical supply means for periodically causing an electric current to flow between a selected cathode module and at least one adjacent anode sheet.

Preferably the components making up the cathode modules are of stainless steel, while the anode sheets are preferably of low chromium stainless steel (with between 5 and 15% chromium, preferably 9% chromium) as this material can be expected to suffer little corrosion in use, as described in GB 2 247 469A. The cathode modules may be of rectangular shape, for example 0.5 m wide and 1.0 m high, and of thickness for example 15 mm; the flow channels are desirably between 2 and 5 mm wide, preferably 3 mm wide.

Typically any one sheet of filter medium can be cleaned by supplying a current of 2000 A/m$^2$ for about 5 s, this being repeated every 15 min, the requisite potential difference between the cathode module and the adjacent anode sheet being about 40 V. To minimise the power requirements, electric current is preferably supplied to no more than one cathode module at any one time, and desirably to only one of the adjacent anode sheets. The electrical supply means is arranged so that over a period of for example 15 mins a cleaning pulse of current is supplied once to each filter medium sheet of each cathode module. In the preferred embodiment each cathode module is connected via a respective switching unit (a thyristor) to a bus bar, while the anode sheets are connected to one of two bus bars, adjacent anode sheets being connected to different bus bars and only one of the anode bus bars being connected (via a switching unit) to the power supply at any one time.

The invention will now be further described by way of example only and with reference to the accompanying drawings in which.

Figure 1:
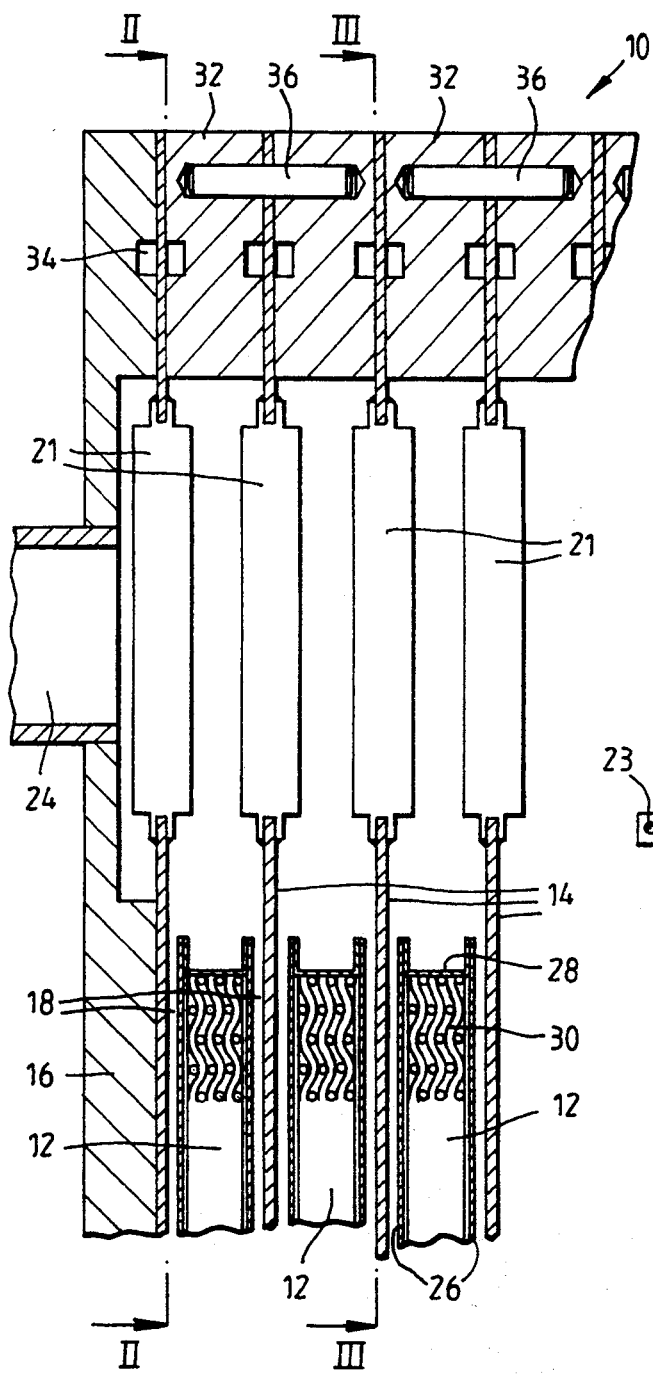
FIG. 1 shows a sectional view of a filter, partly broken away.
Figure 3:
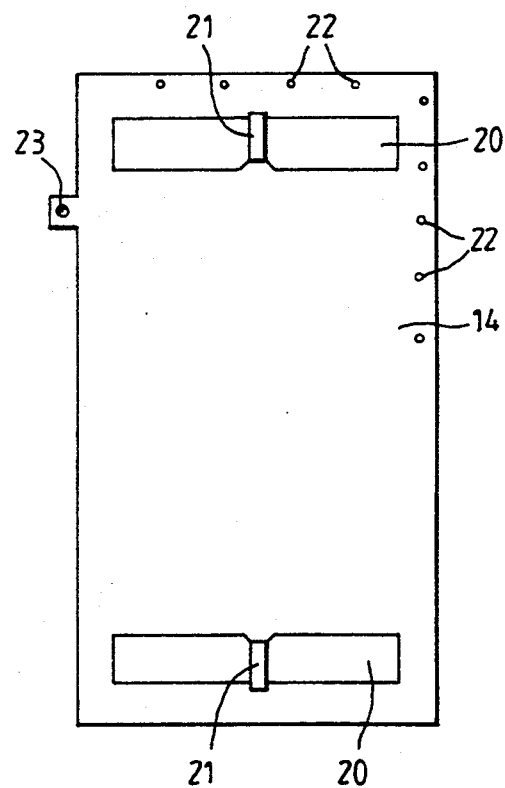
FIG. 3 shows a view on the line III—III of FIG. 1, to a different scale, showing the anode sheet 14 in elevation.

Referring now to FIG. 1 a filter 10 comprises a stack of twenty five cathode modules 12 and twenty six anode sheets 14 arranged alternately between insulating end plates 16 (only one end plate 16, four anode sheets 14 and three cathode modules 12 are shown). They are clamped together by bolts (not shown). Gaps 3 mm wide between surfaces of adjacent anode sheets 14 and cathode modules 12 provide flow channels 18 for a liquid undergoing treatment, and in the preferred arrangement the flow channels 18 are in vertical planes and the liquid flows upwardly. Each anode sheet 14 is a rectangular plate of low chromium (9% chromium) stainless steel 1.0 m by 0.62 m and as shown in FIG. 3 each sheet 14 defines two rectangular apertures 20, one near each end. A strut 21 links the mid points of opposite side of each aperture 20. There is a line of equally spaced circular holes 22 near the edge of each sheet 14 around the entire perimeter (only nine are shown in FIG. 3), the holes 22 in one sheet 14 being in locations mid-way between those in the next sheet 14 in the stack (these two sets of locations are indicated A and B in FIG. 2, respectively). Each sheet 14 has at least one projecting tab 23 to which electrical connection may be made. As is evident from FIG. 1 the apertures 20 define headers at each end of the filter 10 for the liquid undergoing treatment, to which pipes 24 communicate.

Each cathode module 12 comprises two rectangular sheets of filter medium 26 (a 0.5 mm layer of sintered stainless steel microfibres backed by stainless steel 48-mesh support), 0.5 m by 0.65 m, welded around their perimeters to a stainless steel frame 28 of U-shaped cross-section, and spaced apart by welded stainless steel wire grids 30 (preferably consisting of four layers of 3 mm diameter wires at 5 mm gaps), the grids 30 being welded to the frame 28 all around their edges. The sheets 26 and the frame 28 together define a chamber in which filtrate collects.

Figure 2:
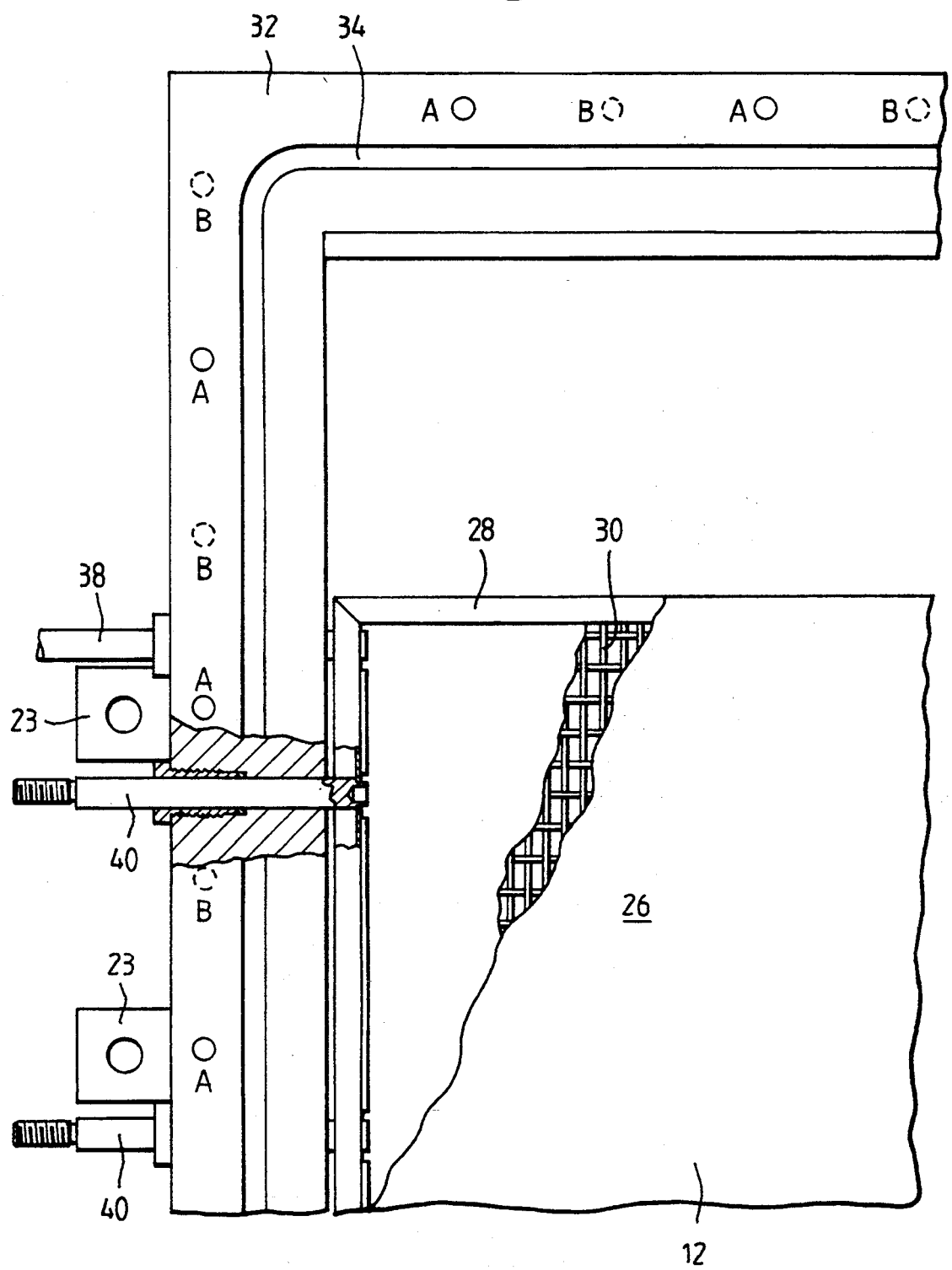
FIG. 2 shows a view on the line II—II of FIG. 1, to a different scale, showing part of the cathode module 12 in elevation.

Referring to FIG. 2, each cathode module 12 is surrounded and supported by a rectangular frame 32 of electrically insulating material, of external dimensions 1.0 m by 0.62 m and of thickness 20 mm. The anode sheets 14 are sandwiched between the frames 32, sealed by seals locating in grooves 34 in the frames 32, and located by pins 36 (shown in FIG. 1) which extend through the peripheral holes 22 in the anode sheets 14 into corresponding recesses in the frames 32 (the recesses being in the locations marked A and B in FIG. 2 on opposite sides of a frame 32).

A tube 38 extends through the frame 32 to communicate with the filtrate chamber in the cathode module 12. The cathode module 12 is supported by twelve electrode rods 40, six on each side (only two are shown) which are sealed through the frame 32 and welded to the frame 28 of the module 12. Outside the frame 32 all the electrode rods 40 from a cathode module 12 are joined by a bus bar (not shown).

Thus in operation, a liquid to be treated is supplied via the pipes 24 to the header at the bottom of the filter 10, flows upwardly in the flow channels 18 to the header at the top of the filter 10, and emerges from the pipes 24 at the top of the filter 10. Typically the liquid is at a pressure of about 2 atmospheres. Filtrate passes through the filter medium 26 into the filtrate chamber, to emerge from the tubes 38 at about 1 atmosphere. To remove any fouling deposited on the filter medium 26 current is supplied to each cathode module 12 in turn.

Figure 4:
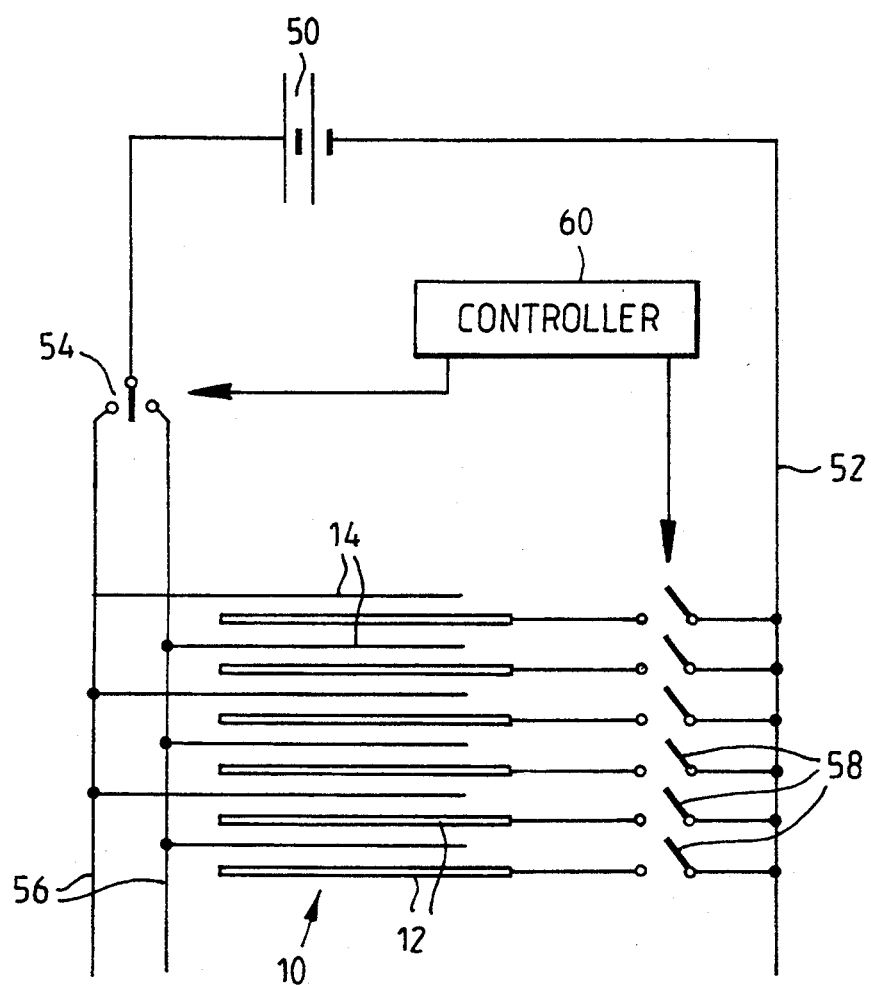
FIG. 4 shows a diagrammatic electric circuit for the filter of FIG. 1.

Referring now to FIG. 4, the electrical circuitry of the filter 10 is shown diagrammatically. A power supply 50, which can supply a current of 1000 A and a voltage of about 40 V is connected to a cathode bus bar 52 and, via switch 54, to one of two anode bus bars 56. Alternate anode sheets 14 in the filter 10 are connected to one anode bus bar 56, and the other anode sheets 14 to the other anode bus bar 56. Each cathode module 12 is connected via a respective switch 58 to the cathode bus bar 52. Preferably the switches 54 and 58 are all thyristors. A controller 60 provides control signals to control operation of all the switches 54 and 58. Current is supplied periodically to each cathode module 12, for example 1000 A for 5 seconds, and each cathode module 12 is treated twice every 15 min, once on each side. To minimize overheating of the liquid, current is supplied consecutively to cathode modules 12 which are spaced apart in the stack.

The filter medium 26 might typically comprise fibres of diameter between 1 and 10 $\mu$m, for example 6 $\mu$m, defining pores of width typically in the range 1 to 40 $\mu$m. It will be appreciated that the electrical conductivity of the liquid to be treated, and the size and nature of the particles to be filtered out, determine what type of filter medium 26 will be most suitable. For some liquids to be treated such a filter medium 26 will be adequate, but for other liquids it may be advantageous to deposit a precoat to create a finer surface pore structure. The precoat might comprise electrically conductive particles such as carbon particles.

We claim:

1. A filter comprising a plurality of cathode modules, each cathode module comprising two electrically conducting flat sheets of filter medium spaced apart to define between them a filtrate chamber, electrically conductive mesh components within the filtrate chamber to support the filter medium, and a frame around the periphery of the cathode module; each cathode module being located between two flat anode sheets of electrically conducting material so as to define, between the cathode module and the adjacent anode sheets, flow channels for a liquid to be treated; electrically insulating means to support the cathode modules relative to the anode sheets; inlet and outlet means for the liquid to be treated, communicating with the said flow channels, and an outlet duct for filtrate from each filtrate chamber; and electrical supply means for periodically causing an electric current to flow between a selected cathode module and at least one adjacent anode sheet.

2. A filter as claimed in claim 1 wherein the anode sheets are of low-chromium stainless steel.

3. A filter as claimed in claim 1 wherein the flow channels are between 2 mm and 5 mm wide.

4. A filter as claimed in claim 1 wherein each cathode module is of rectangular shape.

5. A filter as claimed in claim 1 wherein each cathode module is connected via a respective switching unit to a cathodic bus bar, and the anode sheets are connected to one of two anodic bus bars, adjacent anode sheets being connected to different anodic bus bars and only one of the anodic bus bars being connected, via a switching unit, to the power supply at any one time.

6. A filter as claimed in claim 5 wherein the switching units comprise thyristors.

7. A filter as claimed in claim 1 wherein the filter medium comprises sintered stainless steel microfibres.

8. A filter as claimed in claim 1 wherein the filter medium comprises a fibrous layer and a precoat.

9. A filter as claimed in claim 8 wherein the precoat comprises electrically conductive particles.

* * * * *